(12) United States Patent
Broutin et al.

(10) Patent No.: US 10,731,102 B2
(45) Date of Patent: Aug. 4, 2020

(54) ULTRA-FLUID LUBRICATING COMPOSITION

(71) Applicant: TOTAL MARKETING SERVICES, Puteaux (FR)

(72) Inventors: Laura Broutin, Ternay (FR); Nicolas Obrecht, Meistratzheim (FR)

(73) Assignee: TOTAL MARKETING SERVICES, Puteaux (FR)

( * ) Notice: Subject to any disclaimer, the term of this patent is extended or adjusted under 35 U.S.C. 154(b) by 63 days.

(21) Appl. No.: 15/570,147

(22) PCT Filed: Apr. 29, 2016

(86) PCT No.: PCT/EP2016/059581
§ 371 (c)(1),
(2) Date: Oct. 27, 2017

(87) PCT Pub. No.: WO2016/174186
PCT Pub. Date: Nov. 3, 2016

(65) Prior Publication Data
US 2018/0134983 A1    May 17, 2018

(30) Foreign Application Priority Data
Apr. 30, 2015   (FR) ...................... 15 53930

(51) Int. Cl.
| | | |
|---|---|---|
| C10M 145/14 | (2006.01) | |
| C10M 169/04 | (2006.01) | |
| C08L 53/00 | (2006.01) | |
| C08L 71/02 | (2006.01) | |

(52) U.S. Cl.
CPC ....... *C10M 169/041* (2013.01); *C08L 53/005* (2013.01); *C08L 71/02* (2013.01); *C10M 2205/028* (2013.01); *C10M 2205/0285* (2013.01); *C10M 2205/04* (2013.01); *C10M 2205/06* (2013.01); *C10M 2205/08* (2013.01); *C10M 2207/026* (2013.01); *C10M 2207/2805* (2013.01); *C10M 2207/2815* (2013.01); *C10M 2209/1033* (2013.01); *C10M 2209/1055* (2013.01); *C10M 2215/064* (2013.01); *C10M 2215/28* (2013.01); *C10M 2219/044* (2013.01); *C10M 2219/046* (2013.01); *C10M 2219/068* (2013.01); *C10M 2223/045* (2013.01); *C10N 2210/02* (2013.01); *C10N 2210/06* (2013.01); *C10N 2220/021* (2013.01); *C10N 2220/022* (2013.01); *C10N 2230/02* (2013.01); *C10N 2230/04* (2013.01); *C10N 2230/06* (2013.01); *C10N 2230/10* (2013.01); *C10N 2230/54* (2013.01); *C10N 2230/68* (2013.01); *C10N 2240/10* (2013.01)

(58) Field of Classification Search
CPC .............. C10M 105/34; C10M 145/14; C10M 169/041; C10M 2205/028; C10M 2207/026; C10M 2205/08; C10M 2205/06; C10M 2205/04; C10M 2205/0285; C08L 71/02; C08L 53/005; C10N 2240/10; C10N 2230/68; C10N 2230/54; C10N 2230/10; C10N 2230/06; C10N 2230/04; C10N 2230/02; C10N 2220/022
USPC .................................................. 508/469, 314
See application file for complete search history.

(56) References Cited

U.S. PATENT DOCUMENTS

| | | | |
|---|---|---|---|
| 5,627,146 A | 5/1997 | Tanaka et al. | |
| 6,232,279 B1 | 5/2001 | Steigerwald | |
| 2010/0105589 A1* | 4/2010 | Lee ...................... | C10M 111/04 508/499 |
| 2010/0190671 A1 | 7/2010 | Stoehr et al. | |
| 2013/0079265 A1* | 3/2013 | Eisenberg ............. | C08F 120/18 508/500 |
| 2014/0162924 A1* | 6/2014 | Watts ................... | C10M 143/12 508/591 |

FOREIGN PATENT DOCUMENTS

| | | |
|---|---|---|
| CN | 101492631 A | 7/2009 |
| CN | 103097503 A | 5/2013 |
| CN | 103725385 A | 4/2014 |
| JP | 2001-509183 A | 7/2001 |
| JP | 2002-540287 A | 11/2002 |
| JP | 2010-532805 A | 10/2010 |
| JP | 2013-537572 A | 10/2013 |
| WO | 98/23711 A1 | 6/1998 |
| WO | 00/58423 A1 | 10/2000 |
| WO | 2014/076240 A1 | 5/2014 |

OTHER PUBLICATIONS

Stephan Fengler: "How we're making lubricants more efficient", Mar. 26, 2015, Wesseling, XP055250501, Evonik Industries, F&E Press Conference.
International Search Report, dated Jul. 22, 2016, from corresponding PCT/EP2016/059581 application.
Office Action issued in Chinese Patent Application No. 201680025924 dated Feb. 3, 2020 with English translation provided.

(Continued)

*Primary Examiner* — Prem C Singh
*Assistant Examiner* — Frank C Campanell
(74) *Attorney, Agent, or Firm* — Young & Thompson

(57) ABSTRACT

In the field of lubricating compositions for motor vehicles, there is disclosed a lubricating composition of a grade according to the SAEJ300 classification defined by the formula (X) W (Y) wherein X represents 0 or 5 and Y represents an integer ranging from 4 to 20. This lubricating composition includes at least one polyalphaolefinic oil (PAO), from 10 to 80% by weight of the composition of at least one oil of group V and at least one comb polymer. Also isclosed is the use of this lubricating composition for improving the Fuel Eco (FE) of a lubricant or for reducing the fuel consumption of an engine, in particular a motor vehicle engine, notably a motor of a hybrid vehicle.

13 Claims, No Drawings

(56) References Cited

OTHER PUBLICATIONS

Huang Wenxuan, "Lubricant Additive Properties and Applications," Sinopec Press, May 31, 2012 (characterized in the Chinese Office Action as a "General Knowledge Evidence-Comparative Document".

Xing Yingchun, "Current Status and Development of Refining Plant Technology at Home and Abroad," Petroleum Industry Press, Oct. 31, 2006 (characterized in the Chinese Office Action as a "General Knowledge Evidence-Comparative Document".

* cited by examiner

ULTRA-FLUID LUBRICATING COMPOSITION

DESCRIPTION

The invention relates to the field of lubricating compositions for motor vehicles. The invention provides a lubricating composition of a grade according to the SAEJ300 classification defined by the formula (X) W (Y) wherein X represents 0 or 5 and Y represents an integer ranging from 4 to 20. This lubricating composition comprises at least one polyalphaolefinic oil (PAO), from 10 to 80% by weight of the composition of at least one oil of group V and at least one comb polymer. The invention also relates to the use of this lubricating composition for improving the Fuel Eco (FE) of a lubricant or for reducing the fuel consumption of an engine, in particular a motor vehicle engine, notably a motor of a hybrid vehicle.

The needs for high performance lubricants increase. In particular, because of the conditions of use for which severity increases, for example because of very high temperatures or very high mechanical stresses.

The spacing out of the oil changes and the reduction in the size of the lubrication systems also cause an increase in the need of high performance lubricants.

The energy efficiency and notably the improvement of the Fuel Eco (FE) of the lubricants or the reduction of the fuel consumption of the engines, in particular vehicle engines, are increasingly significant goals and lead to the increasing use of high performance lubricants.

The high performance lubricants should therefore have improved properties, in particular as regards the cinematic viscosity, the viscosity index, the volatility, the dynamic viscosity or the cold pour point.

The thermal stability and the resistance to oxidation are also properties to be improved for high performance lubricants.

Reduced toxicity and good miscibility with other lubricants or other materials are also properties to be sought for high performance lubricants.

These needs are particularly increased during the lubrication of an engine of a hybrid vehicle, in particular as regards the reduction of the friction processes within the engine. The improvement of the conditions of use, for example at particular operating temperatures, should also be targeted, in particular during the rise in temperature of the engine.

In order to improve the energy efficiency of automobile engines via the reduction of the friction processes, the engine lubricants may be used with a viscosity grade increasingly fluid. This phenomenon is all the more significant when the engines operate under low temperature cycles as often imposed by urban paths in most of the large cities of the planet. And this need is all the more significant for hybrid engines. Beyond the reduction in the viscosity grade other solutions give the possibility of increasing the FE gains provided by the engine lubricant.

The lubricating compositions for an engine should also give the possibility of improving the cleanliness of the engine. They should also be compliant with the limits set by the automotive industry.

Therefore there exists a need for high performance lubricants giving the possibility of providing a solution to all or part of the problems of lubricants of the state of the art.

Thus, the invention provides a lubricant composition of a grade according to the SAEJ300 classification defined by the formula (I)

$$(X) W (Y) \qquad (I)$$

wherein
X represents 0 or 5;
Y represents an integer ranging from 4 to 20; and comprising
(a) at least one polyalphaolefinic oil (PAO) for which the cinematic viscosity measured at 100° C. according to the ASTM D445 standard ranges from 1.5 to 8 mm$^2$.s$^{-1}$;
(b) from 10 to 80% by weight of the composition of at least one oil of group V for which the cinematic viscosity measured at 100° C. according to the ASTM D445 standard ranges from 1.5 to 8 mm$^2$.s$^{-1}$;
(c) at least one comb polymer for which the pendant chains comprise at least 50 carbon atoms and selected from copolymers of at least one polyolefin and of at least one poly(alkyl)methacrylate; the copolymers of at least one polyolefin and of at least one poly(alkyl)acrylate.

The lubricating composition according to the invention has a particularly advantageous viscosity grade. The viscosity grade of the lubricant composition according to the invention may notably be selected from among
grade according to the SAEJ300 classification defined by the formulae (II) or (III)

$$0 W (Y) \qquad (II)$$

$$5 W (Y) \qquad (III)$$

wherein Y represents an integer ranging from 4 to 20, in particular ranging from 4 to 16 or from 4 to 12; or
a grade according to the SAEJ300 classification defined by the formulae (IV) or (V)

$$(X) W 8 \qquad (IV)$$

$$(X) W 12 \qquad (V)$$

wherein X represents 0 or 5.

Preferably, the grade according to the SAEJ300 classification of the lubricant composition according to the invention is selected from among 0W4, 0W8, 0W12, 0W16, 0W20, 5W4, 5W8, 5W12, 5W16, 5W20. More preferably, the lubricant composition according to the invention has a grade according to the SAEJ300 classification of 0W12.

Also preferably, the cinematic viscosity measured at 40° C. according to the ASTM D445 standard of the lubricant composition according to the invention ranges from 12 to 30 mm$^2$.s$^{-1}$, preferably from 14 to 25 mm$^2$.s$^{-1}$.

The composition according to the invention comprises at least one polyalphaolefinic oil (PAO), from 10 to 80% by weight of the composition of at least one oil of group V and at least one comb polymer.

Preferably, the lubricant composition according to the invention comprises a PAO for which the cinematic viscosity, measured at 100° C. according to the ASTM D445 standard, ranges from 1.5 to 6 mm$^2$.s$^{-1}$ or from 2 to 8 mm$^2$.s$^{-1}$ or further from 2 to 6 mm$^2$.s$^{-1}$.

The average weight molecular mass of the PAO may vary quite considerably. Preferably, the average weight molecular mass of the PAO is less than 500 Da. The weight average molecular mass of the PAO may also range from 50 to 500 Da, from 50 to 350 Da or further from 50 to 300 Da.

Also preferably, the lubricant composition according to the invention comprises a lightweight PAO, in particular a PAO for which the cinematic viscosity at 100° C., measured according to the ASTM D445 standard, ranging from 3 to 4 mm$^2$.s$^{-1}$, and which comprises more than 50% by weight of 9-methyl-11-octyl-henicosane, a trimer of the 1-decene of formula (A)

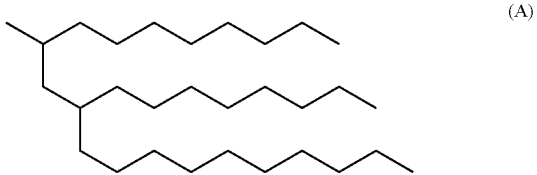 [SMILES: CCCCCCCCCCC(CCCCCCCC)CC(C)CCCCCCCC]

(A)

In addition to the PAO, the lubricant composition according to the invention comprises an oil of group V in an amounts ranging from 10 to 80% by weight of the lubricant composition. Preferably, the lubricant composition according to the invention comprises from 20 to 80%, from 20 to 60%, from 20 to 50% or from 30 to 80%, from 30 to 60%, from 30 to 50% by weight of the composition of an oil of group V. More preferably, the lubricant composition according to the invention comprises from 35 to 45%, for example 40%, by weight of the oil composition of group V.

Also preferably, the lubricant composition according to the invention comprises an oil of group V selected from among a monoester, a diester, a polyester, an estolide, a polyalkylene-glycol (PAG). Preferably, the oil of group V is selected from among a monoester or a polyalkylene-glycol (PAG).

As a preferred monoester, mention may be made of a monoester of formula (B1);

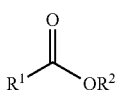

(B1)

wherein
R$^1$ represents a saturated or unsaturated, linear or branched hydrocarbon group comprising from 14 to 24 carbon atoms;
R$^2$ represents a linear or branched, saturated or unsaturated hydrocarbon group comprising from 2 to 18 carbon atoms;

As a more preferred monoester, mention may be made of a monoester of formula (B1) wherein
R$^1$ is a saturated group and R$^2$ is an unsaturated group; or
R$^1$ is an unsaturated group and R$^2$ is a saturated group; or
R$^1$ and R$^2$ are saturated groups; or
R$^1$ and R$^2$ are unsaturated groups; or further
one monoester of formula (B1) wherein
R$^1$ represents a linear or branched saturated or unsaturated hydrocarbon group, comprising from 14 to 20 carbon atoms, preferentially from 14 to 18 carbon atoms, more preferentially from 16 to 18 carbon atoms; or
R$^2$ represents a linear or branched saturated or unsaturated hydrocarbon group, comprising from 3 to 14 carbon atoms, preferentially from 4 to 12 carbon atoms, more preferentially from 4 to 10 carbon atoms; or R$^1$ is a linear group and R$^2$ is a branched group; or
R$^1$ is a branched group and R$^2$ is a linear group; or
R$^1$ and R$^2$ are linear groups; or
R$^1$ and R$^2$ are branched groups.

As a particularly preferred monoester, mention may be made of a monoester of formula (B1) in which only R$^1$, only R$^2$ or R$^1$ and R$^2$ are selected from among
a linear saturated group;
a branched saturated group comprising from 1 to 5 branched chains;
a branched saturated group for which the branched chains comprised from 1 to 5 carbon atoms;
a branched saturated group comprising from 1 to 5 branched chains and for which the branched chains comprised from 1 to 5 carbon atoms.

As examples of preferred monoesters, mention may be made of
stearates, preferably alkyl stearates and alkenyl stearates, more preferentially C$_4$-C$_{10}$-alkyl stearates, in particular butyl stearate, pentyl stearate, hexyl stearate, heptyl stearate, octyl stearate, nonyl stearate, decyl stearate;
oleates, preferably alkyl oleates and alckenyl oleates, more preferentially C$_4$-C$_{10}$-alkyl oleates, in particular butyl oleate, pentyl oleate, hexyl oleate, heptyl oleate, octyl oleate, nonyl oleate, decyl oleate.

As examples of preferred monoesters, mention may also be made of alkene monoesters and alkyl monoesters, preferably C$_2$-C$_{10}$-alkyl monoesters, in particular ethyl monoesters, propyl monoesters, butyl monoesters, pentyl monoesters, hexyl monoesters.

As a preferred polyalkylene-glycol (PAG), mention may be made of a PAG of formula (B2)

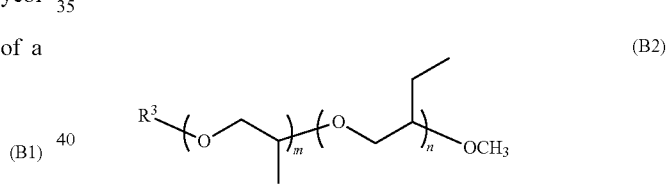

(B2)

wherein
R$^3$ represents a linear and branched C$_1$-C$_{30}$-alkyl group;
m and n represent independently an average number ranging from 1 to 5.

Preferably for the PAG of formula (B2), R$^3$ represents a group selected from among a linear C$_8$-alkyl group; a branched C$_8$-alkyl group; a linear C$_9$-alkyl group; a branched C$_9$-alkyl group; a linear C$_{10}$-alkyl group; a branched C$_{10}$-alkyl group; a linear C$_{11}$-alkyl group; a branched C$_{11}$-alkyl group; a linear C$_{12}$-alkyl group; a branched C$_{12}$-alkyl group; a linear C$_{13}$-alkyl group; a branched C$_{13}$-alkyl group; a linear C$_{14}$-alkyl group; a branched C$_{14}$-alkyl group; a linear C$_{15}$-alkyl group; a branched C$_{15}$-alkyl group.

Also preferably for the PAG of formula (B2),
m is greater than or equal to n; or
m represents an average number ranging from 2 to 4.5, notably an average number ranging from 2 to 3.5; or
n represents an average number ranging from 1.5 to 4, notably an average number ranging from 1.5 to 3.

More preferably for the PAG of formula (B2), m represents an average number equal to 2.5 and n represents an average number equal to 2 or m represents an average number equal to 3.5 and n represents an average number equal to 2.8. Advantageously for the lubricant composition according to the invention, the PAG of formula (B2) has
  a cinematic viscosity at 100° C., measured according to the ASTM D445 standard, ranging from 2.5 to 4.5 mm².s⁻¹; or
  a viscosity index greater than 160 or comprised between 160 and 210; or
  a pour point of less than −40° C., or
  a dynamic viscosity (CCS) at −35° C., measured according to the ASTM D5293 standard of less than 1,200 mPa.s.

A preferred exemplary PAG is a PAG of formula (B2) wherein m represents an average number equal to 2.5 and n represents an average number equal to 2 and for which the cinematic viscosity at 100° C., measured according to the ASTM D445 standard, ranges from 2.5 to 3.5 mm².s⁻¹; the viscosity index is comprised between 160 and 180; the pour point is less than −40° C., the dynamic viscosity (CCS) at −35° C., measured according to the ASTM D5293 standard is less than 500 mPa.s.

Another preferred exemplary PAG is a PAG of formula (B2) wherein m represents an average number equal to 3.5 and n represents an average number equal to 2.8 and for which the cinematic viscosity at 100° C., measured according to the ASTM D445 standard, ranges from 3.5 to 4.5 mm².s⁻¹; the viscosity index is comprised between 180 and 210; the pour point is less than −50° C.; the dynamic viscosity (CCS) at −35° C., measured according to the ASTM D5293 standard is less than 1,200 mPa.s.

As another polyalkylene-glycol (PAG), mention may be made of a polymer with blocks of formula (B3) or a random polymer of formula (B3)

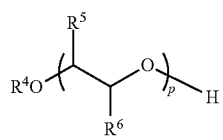

wherein
  $R^4$ represents a linear or branched $C_1$-$C_{30}$-alkyl group, preferably a linear or branched $C_8$-$C_{12}$-alkyl group;
  represents a number ranging from 2 to 60, preferably from 5 to 30 or from 7 to 15;
  $R^5$ and $R^6$, either identical or different, represent independently a hydrogen atom or a $C_1$-$C_2$-alkyl group.

As other particular polyalkylene-glycol groups (PAG), mention may be made of
a polymer with blocks of formula (B4) or a random polymer of formula (B4)

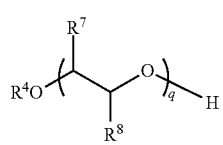

wherein
  $R^4$ represents a linear or branched $C_1$-$C_{30}$-alkyl group, preferably a linear or branched $C_8$-$C_{12}$-alkyl group;
  q represents a number ranging from 2 to 60, preferably from 5 to 30 or from 7 to 15;

$R^7$ and $R^8$ represent a hydrogen atom; or $R^7$ represents a hydrogen atom and $R^8$ represents a methyl group; or $R^7$ represents a methyl group and $R^8$ represents a hydrogen atom; wherein $R^7$ and $R^8$ represent a methyl group; or $R^7$ represents an ethyl group and $R^8$ represents a hydrogen atom; or $R^7$ represents a hydrogen atom and $R^8$ represents an ethyl group;
a polymer with blocks of formula (B5) or a random polymer of formula (B5)

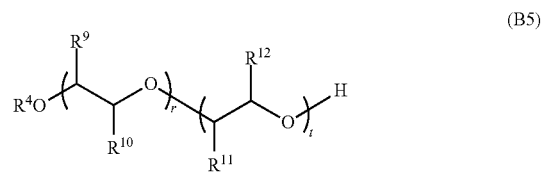

wherein
  $R^4$ represents a linear or branched $C_1$-$C_{30}$-alkyl group, preferably a linear or branched $C_8$-$C_{12}$-alkyl group;
  r and t represent independently a number ranging from 1 to 30, preferably from 2 to 15 or from 2 to 8;
  $R^9$ and $R^{10}$ represent a hydrogen atom; or $R^9$ represents a hydrogen atom and $R^{10}$ represents a methyl group; or $R^9$ represents a methyl group and $R^{10}$ represents a hydrogen atom; or $R^9$ and $R^{10}$ represent a methyl group; or $R^9$ represents an ethyl group and $R^{10}$ represents a hydrogen atom; or $R^9$ represents a hydrogen atom and $R^{10}$ represents an ethyl group;
  $R^{11}$ and $R^{12}$ represent a hydrogen atom; or $R^{11}$ represents a hydrogen atom and $R^{12}$ represents a methyl group; or $R^{11}$ represents a methyl group and $R^{12}$ represents a hydrogen atom; or $R^{11}$ and $R^{12}$ represent a methyl group; or $R^{11}$ represents an ethyl group and $R^{12}$ represents a hydrogen atom; or $R^{11}$ represents a hydrogen atom and $R^{12}$ represents an ethyl group.

Like other particular polyalkylene-glycol (PAG) groups, mention may be made of a polymer with blocks of formula (B6) or a random polymer of formula (B6)

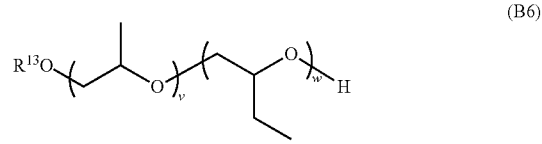

wherein
  $R^{13}$ represents a linear or branched $C_8$-$C_{12}$-alkyl group;
  v represents a number ranging from 2 to 6;
  w represents a number ranging from 2 to 5.

In addition to a PAO and an oil of group V, the lubricant composition according to the invention comprises a comb polymer.

Preferably, the comb polymer comprises pendant chains obtained by polymerization or by copolymerization of olefins. In a more preferred way, the comb polymer comprises pendant chains obtained by polymerization or by copolymerization of olefins comprising from 8 to 17 carbon atoms, in particular of olefins selected from among styrenes, substituted styrenes, butadiene with an addition in 1,4, butadiene with an addition in 1,2, the compounds of formula (C1)

(C1)

wherein $Q^1$ and $Q^2$ represent independently a hydrogen atom or a $C_1$-$C_{18}$-alkyl group.

More preferably, the comb polymer is prepared by copolymerization
of an olefinic monomer of formula (C2)

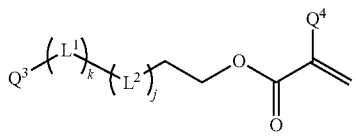
(C2)

wherein $Q^3$ represents a linear or branched $C_2$-$C_8$-alkyl group; a $C_3$-$C_8$-cycloalkyl group; a $C_6$-$C_{10}$-aryl group;

$Q^4$ represents a hydrogen atom or a methyl group;

$L^1$ represents a residue of 1,4 addition of butadiene; a residue of 1,4 addition of butadiene substituted with at least one $C_1$-$C_6$-alkyl group; a residue of vinyl addition of styrene; a residue of vinyl addition of styrene substituted with at least one $C_1$-$C_6$-alkyl group;

$L^2$ represents a residue of vinyl addition of butadiene; a residue of vinyl addition of butadiene substituted with a $C_1$-$C_6$-alkyl group; a residue of vinyl addition of styrene; a residue of vinyl addition of styrene substituted with at least one $C_1$-$C_6$-alkyl group;

k and j represent independently 0 or an integer ranging from 1 to 3,000 and the sum (k+j) is equal to an integer ranging from 7 to 3,000, preferably ranging from 10 to 3,000; et of a acrylic-alkyl ester monomer or methacrylic-alkyl ester of formula (C3)

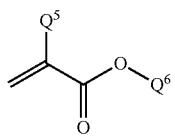
(C3)

wherein $Q^5$ represents a hydrogen atom or a methyl group;

$Q^6$ represents a linear or branched $C_1$-$C_{26}$-alkyl group.

More preferably, $Q^3$ represents a phenyl group or a linear or branched butyl group, in particular an n-butyl group.

In a more particularly preferred way, the comb polymer is prepared by copolymerization
of an olefinic monomer of formula (C4)

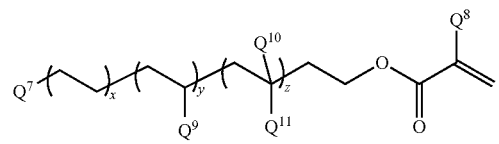
(C4)

wherein $Q^7$ represents a $C_1$-$C_6$-alkyl; a $C_6$-aryl group;

$Q^8$ represents a hydrogen atom or a methyl group;

$Q^9$, $Q^{10}$ et $Q^{11}$ represent independently a hydrogen atom or a $C_1$-$C_{18}$-alkyl group;

x, y and z represent independently 0 or an integer ranging from 1 to 3,000 and the sum (x+y+z) is equal to an integer ranging from 7 to 3,000, preferably ranging from 10 to 3,000; and of an acrylic-alkyl ester monomer or methacrylic-alkyl ester of formula (C3)

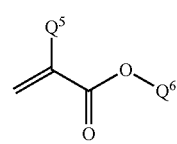
(C3)

wherein $Q^5$ represents a hydrogen atom or a methyl group;

$Q^6$ represents a linear or branched $C_1$-$C_{26}$-alkyl group.

More preferably, $Q^7$ represents a phenyl group or a linear or branched butyl group, in particular an n-butyl group.

In a more particularly preferred way, the comb polymer is prepared by copolymerization
of an olefinic monomer of formula (C5)

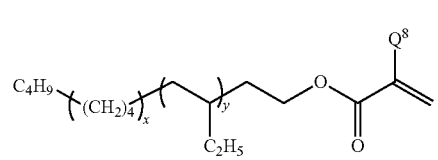
(C5)

wherein $Q^8$ represents a hydrogen atom or a methyl group;

x and y represent independently 0 or an integer ranging from 1 to 3,000 and the sum (x+y+z) is equal to an integer ranging from 7 to 3,000, preferably ranging from 10 to 3,000; and of an acrylic-alkyl ester monomer or methacrylic-alkyl ester of formula (C3)

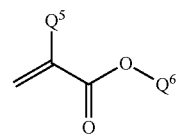
(C3)

wherein $Q^5$ represents a hydrogen atom or a methyl group;

$Q^6$ represents a linear or branched $C_1$-$C_{26}$-alkyl group.

An example of a comb polymer is the product Viscoplex 3-200 (Evonik Corporation).

Within the lubricant composition according to the invention, the respective amounts (a) of PAO, (b) of an oil of group V and (c) of a comb polymer may vary. Preferably, the weight ratio (a/b) between the polyalphaolefinic oil (PAO) (a) and the oil of group V (b) ranges from 0.1 to 4, preferably from 0.3 to 3.6.

The lubricant composition according to the invention has a particularly high VI. Preferably, the VI of the lubricant composition according to the invention is greater than 220. More preferably, the VI of the lubricant composition according to the invention is greater than 250, or even greater than 270 or than 300.

Generally, the lubricant composition according to the invention may comprise other base oils, mineral, synthetic or natural, animal or vegetable oils, adapted to its use.

The base oils used in the lubricant compositions according to the invention may be oils of mineral or synthetic origins belonging to the groups I to V according to the classes defined by the API classification (or their equivalents according to the ATIEL classification) (table A) or mixtures thereof.

TABLE A

| | Contents of saturated substances | Sulfur content | Viscosity index (VI) |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydro-isomerized oils | ≥90% | ≤0.03% | ≥120 |
| Group IV | Polyalphaolefins (PAO) | | |
| Group V | Esters and other bases not included in the groups I to IV | | |

The mineral base oils according to the invention include all types of bases obtained by atmospheric and in vacuo distillation of crude oil, followed by refining operations such as extraction with a solvent, de-asphalting, de-waxing with a solvent, hydro-treatment, hydrocracking, hydroisomerization and hydrofinishing.

Mixtures of synthetic and mineral oils may also be used.

Generally there does not exit any limitation as to the use of different lubricant bases for producing the lubricant compositions according to the invention, except that they have to have properties, notably viscosity properties, a viscosity index, a sulfur content, a resistance to oxidation, adapted to the use for engines or for vehicle transmissions.

The base oils of the lubricant compositions according to the invention may also be selected from among synthetic oils, such as certain esters of carboxylic acids and of alcohols, and from among polyalphaolefins. The polyalphaolefins used as base oils are for example obtained from monomers comprising from 4 to 32 carbon atoms, for example from octene or decene, and for which the viscosity at 100° C. is comprised between 1.5 and 15 $mm^2.s^{-1}$ according to the ASTM D445 standard. Their average molecular mass is generally comprised between 250 and 3,000 according to the ASTM D5296 standard.

The lubricant composition according to the invention may comprise at least 50% by mass of base oils based on the total mass of the composition. More advantageously, the lubricant composition according to the invention comprises at least 60% by mass, or even at least 70% by mass, of base oils based on the total mass of the composition. In a more particularly advantageous way, the lubricant composition according to the invention comprises from 75 to 99.9% by mass of base oils based on the total mass of the composition.

The invention also provides a lubricant composition for engines of vehicles comprising at least one lubricant composition according to the invention, at least one base oil and at least one additive.

Many additives may be used for this lubricant composition according to the invention.

The preferred additives for the lubricant composition according to the invention are selected from among detergent additives, anti-wear additives, friction modifier additives, extreme pressure additives, dispersants, enhancers of the pour point, anti-foam agents, thickeners and mixtures thereof.

Preferably, the lubricant composition according to the invention comprises at least one anti-wear additive, at least one extreme pressure additive or mixtures thereof.

The anti-wear additives and the extreme pressure additives protect the friction surfaces by forming a protective film adsorbed on these surfaces.

There exist a large variety of anti-wear additives. Preferably for the lubricant composition according to the invention, the anti-wear additives are selected from among phosphorus-sulfur-containing additives like metal alkylthiophosphates, in particular zinc alkylthiophosphates, and more specifically zinc dialkyldithiophosphates or ZnDTP. The preferred compounds are of formula $Zn((SP(S)(OR)(OR'))_2$, wherein R and R', either identical or different, represent independently an alkyl group, preferentially an alkyl group including from 1 to 18 carbon atoms.

The amine phosphates are also anti-wear additives which may be used in the lubricant composition according to the invention. However, the phosphorus brought by these additives may act as a poison of catalytic systems of automobiles since these additives are ash generators. It is possible to minimize these effects by partly substituting the amine phosphates with additives not providing any phosphorus, such as for example, polysulfides, notably sulfur-containing olefins.

Advantageously, the lubricant composition according to the invention may comprise from 0.01 to 6% by mass, preferentially from 0.05 to 4% by mass, more preferentially from 0.1 to 2% by mass based on the total mass of lubricant composition, of anti-wear additives and extreme pressure additives.

Advantageously, the lubricant composition according to the invention may comprise at least one friction modifier additive. The friction modifier additive may be selected from among a compound providing metal elements and a compound free of ashes. Among the compounds providing metal elements, mention may be made of complexes of transition metals such as Mo, Sb, Sn, Fe, Cu, Zn for which the ligands may be hydrocarbon compounds comprising oxygen, nitrogen, sulfur or phosphorus atoms. The friction modifier additives free of ashes are generally of organic origin and may be selected from among fatty acid monoesters and from polyols, alkoxylated amines, alkoxylated fatty amines, fatty epoxides, borate fatty epoxides; fatty amines or esters of fatty acid glycerol. According to the invention, the fatty compounds comprise at least one hydrocarbon group comprising from 10 to 24 carbon atoms.

Advantageously, the lubricant composition according to the invention may comprise from 0.01 to 2% by mass or from 0.01 to 5% by mass, preferentially from 0.1 to 1.5% by mass or from 0.1 to 2% by mass based on the total mass of the lubricant composition, of a friction modifier additive.

Advantageously, the lubricant composition according to the invention may comprise at least one antioxidant additive.

The antioxidant additive may generally delay the degradation of the lubricant composition being used. This degradation may notably be expressed by the formation of deposits, by the presence of sludges or by an increase in the viscosity of the lubricant composition.

The antioxidant additives notably act as radical inhibitors or hydroperoxide destructive inhibitors. From among the currently used antioxidant additives, mention may be made of the antioxidant additives of the phenolic type, of the antioxidant additives of the aminated type, of the phosphorus-sulfur-containing antioxidant additives. Certain of these antioxidant additives, for example the phosphorus-sulfur-containing antioxidant additives may be generators of ashes. The antioxidant phenolic additives may be free of ashes or else be in the form of metal salts either neutral or basic. The antioxidant additives may notably be selected from among sterically hindered phenols, sterically hindered phenol esters and sterically hindered phenols comprising a thioether bridge, diphenylamines, diphenylamines substituted with at least one $C_1$-$C_{12}$ alkyl group, N,N'-dialkyl-aryl-diamines and mixtures thereof.

Preferably according to the invention, the sterically hindered phenols are selected from among the compounds comprising a phenol group for which at least one carbon in the neighborhood of the carbon bearing the alcohol function is substituted with at least one $C_1$-$C_{10}$ alkyl group, preferably a $C_1$-$C_6$ alkyl group, preferably a $C_4$ alkyl group, preferably by the ter-butyl group.

The aminated compounds are another class of antioxidant additives which may be used, optionally in combination with phenolic antioxidant additives. Examples of aminated compounds are aromatic amines, for example aromatic amines of formula $NR^aR^bR^c$ wherein $R^a$ represents an aliphatic group or an aromatic group, optionally substituted, $R^b$ represents an aromatic group, optionally substituted, $R^c$ represents a hydrogen atom, an alkyl group, an aryl group or a group of formula $R^dS(O)_zR^e$ wherein $R^d$ represents an alkylene group or an alkenylene group, $R^e$ represents an alkyl group, an alkenyl group or an aryl group and z represents 0, 1 or 2.

Sulfur-containing phenol alkyls or their alkaline metal and earth-alkaline metal salts may also be used as antioxidant additives.

Another class of antioxidant additives is that of copper-containing compounds, for examples copper thio- or dithiophosphates, copper salts and of carboxylic acids, dithiocarbamates, sulphonates, phenates, copper acetylacetonates. The copper salts I and II, salts of succinic acid or anhydride may also be used.

The lubricant composition according to the invention may contain any types of antioxidant additives known to one skilled in the art.

Advantageously, the lubricant composition comprises at least one antioxidant additive free of ashes.

Also advantageously, the lubricant composition according to the invention comprises from 0.1 to 2% by weight based on the total mass of the composition, of at least one antioxidant additive.

The lubricant composition according to the invention may also comprise at least one detergent additive.

Detergent additives generally give the possibility of reducing the formation of deposits at the surface of metal parts by dissolving secondary oxidation and combustion products.

The detergent additives which may be used in the lubricant composition according to the invention are generally known to one skilled in the art. The detergent additives may be anionic compounds comprising a long lipophilic hydrocarbon chain and a hydrophilic head. The associated cation may be a metal cation of an alkaline or earth-alkaline metal.

The detergent additives are preferentially selected from among salts of alkaline metals or of earth-alkaline metals of carboxylic acids, sulfonates, salicylates, naphthenates, as well as salts of phenates. The alkaline and earth-alkaline metals are preferentially calcium, magnesium, sodium or barium.

These metal salts generally comprise the metal in a stoichiometric amount or else in an excess amount, therefore in an amount greater than the stoichiometric amount. These are then overbased detergent additives; the excess metal providing the overbased nature to the detergent additive is then generally in the form of a metal salt insoluble in oil, for example a carbonate, a hydroxide, an oxalate, an acetate, a glutamate, preferentially a carbonate.

Advantageously, the lubricant composition according to the invention may comprise from 0.5 to 8% or from 2 to 4% by weight of a detergent additive based on the total mass of the lubricant composition.

Also advantageously, the lubricant composition according to the invention may also comprise at least one pour point lowering additive.

By slowing down the formation of paraffin crystals, the pour point lowering additives generally improve the cold behavior of the lubricant composition according to the invention.

As an example of pour point lowering additives, mention may be made of alkyl polymethacrylates, polyacrylates, polyarylamides, polyalkylphenols, polyalkylnaphthalenes, alkyl polystyrenes.

Advantageously, the lubricant composition according to the invention may also comprise a dispersant agent.

The dispersant agent may be selected from among Mannich bases, succinimides and derivatives thereof.

Also advantageously, the lubricant composition according to the invention may comprise from 0.2 to 10% by mass of a dispersant agent based on the total mass of the lubricant composition.

Advantageously, the lubricant composition may also comprise at least one additional polymer improving the viscosity index. As examples of an additional polymer improving the viscosity index, mention may be made of polymeric esters, homopolymers or copolymers, either hydrogenated or not, hydrogenated, of styrene, of butadiene and of isoprene, polymethacrylates (PMA). Also advantageously, the lubricant composition according to the invention may comprise from 1 to 15% by mass based on the total mass of the lubricant polymeric composition improving the viscosity index.

In addition to a lubricant composition, the invention also relates to the use of this lubricant composition. In particular, the invention relates to the use of a lubricant composition according to the invention for the lubrication of a vehicle engine, in particular 14 for the lubrication of an engine of a hybrid vehicle.

Preferably, the use of a lubricant composition according to the invention gives the possibility of improving the lubrication of a vehicle engine. In a particularly preferred way, the use of a lubricant composition according to the invention gives the possibility of improving the lubrication of a vehicle engine during an urban cycle defined according to the European cycle NEDC or during an urban cycle defined according to the European cycle WLTP or further during a cold cycle defined according to the European cycle ECE.

The invention also relates to the use of a lubricant composition according to the invention for improving the Fuel Eco (FE) of a lubricant.

The invention also relates to the use of a lubricant composition according to the invention for reducing the fuel consumption of an engine, in particular of a vehicle engine, notably of an engine of a hybrid vehicle.

According to the invention, the particular, advantageous or preferred features of the lubricant composition according to the invention, give the possibility of defining the uses according to the invention which are also particular, advantageous or preferred.

The different aspects of the invention may be illustrated by the following examples.

EXAMPLE 1

Preparation of Lubricant Compositions According to the Invention

The different components of the lubricant compositions according to the invention are mixed depending on the nature and on the amounts of products shown in table 1.

TABLE 1

|  | Lubricant compositions according to the invention (% by weight) | | | |
|---|---|---|---|---|
|  | CL1 | CL2 | CL3 | CL4 |
| PAO - (Durasyn 164 Ineos) | 64.2 | 44.2 | 24.2 | 44.2 |
| Oil of Group V - Monoester (Priolube 1414 Croda) | 20 | 40 | 60 | 0 |
| Oil of Group V - PAG of formula (B2) with $R^3 = C_{12}H_{25}$, m = 2.45 and n = 1.97 | 0 | 0 | 0 | 40 |
| Comb polymer - Comb polymethacrylate (Viscoplex 3-200 Evonik) | 6.2 | 6.2 | 6.2 | 6.2 |
| Packet of additives —Ca sulfonates, antioxidant agents of the alkylated and hindered phenol diphenylamine type, ZnDTP secondary, dispersant of the bisuccinimide type | 8.6 | 8.6 | 8.6 | 8.6 |
| Anti-friction agent MoDTC (Sakuralube 525 Adeka) | 1.0 | 1.0 | 1.0 | 1.0 |

The characteristics of these lubricant compositions according to the invention are shown in table 2.

TABLE 2

|  | Lubricant composition | | | |
|---|---|---|---|---|
|  | CL1 | CL2 | CL3 | CL4 |
| SAEJ300 Grade | 0W12 | 0W12 | 0W12 | 0W16 |
| calculated KV 130 ($mm^2 \cdot s^{-1}$) | 4.62 | 4.32 | 4.63 | 4.79 |
| KV100 - ISO 3104 ($mm^2 \cdot s^{-1}$) | 6.950 | 6.43 | 6.995 | 7.191 |
| KV40 - ISO3104 ($mm^2 \cdot s^{-1}$) | 23.31 | 20.92 | 23.79 | 24.45 |
| VI - ISO2909 | 284 | 296 | 283 | 287 |
| HTHS at 150 C. - CEC L-036 ($mPa \cdot s$) | 2.24 | 2.17 | 2.15 | 2.83 |
| CCS at −35 C. - ASTM D5293 ($mPa \cdot s$) | / | 839 | / | 1,415 |

EXAMPLE 2

Preparation of Comparative Lubricant Compositions

The different components of the comparative lubricant compositions according to the nature and to the amounts of the products presented in table 3.

TABLE 3

|  | Comparative composition (% by weight) | |
|---|---|---|
|  | CC1 | CC2 |
| PAO - (Durasyn 164 Ineos) | 44.2 | 84.2 |
| Group V Oil- Monoester (Priolube 1414 Croda) | 40 | 0 |
| Polymer - Linear Polymethacrylate (Viscoplex 6-054 Evonik) | 6.2 | 0 |
| Comb polymer - Comb Polymethacrylate (Viscoplex 3-200 Evonik) | 0 | 6.2 |
| Packet of additves - Ca sulfonates, antioxidant agents of the alkylated and hindered phenol and diphenylamine type, secondary ZnDTP, dispersant of the bisuccinimide type | 8.6 | 8.6 |
| Anti-friction agent MoDTC (Sakuralube 525 Adeka) | 1.0 | 1.0 |

The first comparative lubricant composition (CC1) does not comprise any comb polymethacrylate but a linear polymethacrylate. The second comparative lubricant composition (CC2) does not comprise any oil of group V but only the oil of group IV. The characteristics of these comparative lubricant compositions are shown in table 4.

TABLE 4

|  | Comparative lubricant composition | |
|---|---|---|
|  | CC1 | CC2 |
| SAEJ300 Grade | 0W12 | 0W16 |
| calculated KV 130 ($mm^2 \cdot s^{-1}$) | 3.84 | 4.03 |
| KV100 - ISO 3104 ($mm^2 \cdot s^{-1}$) | 5.970 | 6.358 |
| KV40 - ISO3104 ($mm^2 \cdot s^{-1}$) | 23.08 | 26.19 |
| VI - ISO2909 | 225 | 210 |
| HTHS at 150 C. - CEC L-036 ($mPa \cdot s$) | 2.14 | 2.30 |
| CCS at −35 C. - ASTM D5293 ($mPa \cdot s$) | 968 | 2,268 |

EXAMPLE 3

Evaluation of the Fuel Saving Performances of the Lubricant Compositions According to the Invention (CL2 and CL4) and of the Comparative Lubricant Composition (CC1)

During several tests according to the conditions described in the examples of WO 2012-025901, the fuel consumption during the lubrication by means of the lubricant composition according to the invention is compared with the fuel consumption during the use of a reference lubricant composition (base oil and packet of additives similar to the packet of additives of the composition according to the invention—SAEJ300 grade 5W30). The fuel consumption gains are evaluated by taking as a reference the fuel consumptions resulting from the use of this reference lubricant composition. The obtained results are shown in table 5.

TABLE 5

| | Gain obtained by means of the lubricant composition (%) | | |
|---|---|---|---|
| | CL2 | CL4 | CC1 |
| Full NEDC cycle | 4.89 | 4.01 | 4.73 |
| NEDC cycle cold ECE phase | 12.84 | 10.34 | 11.11 |
| NEDC cycle mixed urban cycle phase | 7.48 | 5.58 | 6.03 |

It is seen that the lubricant compositions CL2 and CL4 according to the invention give the possibility of obtaining very significant fuel consumption gains. Thus, the lubricant composition according to the invention CL2 allows gains larger than those obtained with the comparative lubricant composition CC1 which does not comprise any comb polymethacrylate. Moreover, the lubricant composition according to the invention CL4 comprises an oil of group V of the PAG type also gives the possibility of significant gains.

More particularly it is seen that these lubricant compositions according to the invention give the possibility of highly significant fuel savings gains on the engine cycle at a low temperature and at a low engine speed, which demonstrates the benefit of these lubricant compositions according to the invention for obtaining even more significant fuel savings under urban conditions.

EXAMPLE 4

Evaluation of the Performances of the Traction Coefficient of the Lubricant Compositions According to the Invention (CL1, CL2 and CL3) and of a Comparative Lubricant Composition (CC2)

The traction coefficient of the lubricant compositions is evaluated and the obtained results are shown in table 6.

TABLE 6

| | Lubricant composition | | | |
|---|---|---|---|---|
| | CL1 | CL2 | CL3 | CC2 |
| traction coefficient (MTM: T = 40 C., $V_e$ = 1 m.$^{-1}$, SRR = 20% of load = 25N) | 0.019 | 0.018 | 0.016 | 0.023 |

The lubricant compositions according to the invention therefore have very good traction coefficients. These results confirm that the lubricant compositions according to the invention give the possibility of reducing the friction coefficient and therefore to improve the fuel savings gain as compared with a comparative lubricant composition comprising a PAO and a comb polymer according to the invention but not comprising any oil of group V according to the invention, and this with different oil contents of group V.

EXAMPLE 5

Evaluation of the Engine Cleanliness Performances of the Lubricant Compositions According to the Invention (CL1, CL2, CL3 and CL4) and of a Comparative Lubricant Composition (CC2)

The engine cleanliness properties are evaluated by the TEOST MHT test according to the standard ASTM D7097 and the obtained results are shown in table 7 and expressed in milligrams. The maximum acceptable value, notably for most automobile manufacturers, is equal to 35 mg according to the ILSAC classification for an oil of grade 0Wxx.

TABLE 7

| | Lubricant composition | | | | |
|---|---|---|---|---|---|
| | CL1 | CL2 | CL3 | CL4 | CC2 |
| Deposit on the Teost MHT rod - ASTM D7097 (mg) | 12.2 | 11.9 | 22.7 | 10.7 | 7.6 |

The lubricant compositions according to the invention therefore give the possibility of retaining good engine cleanliness, or even to improve the engine cleanliness and to be compliant with the limits set by the automobile industry. It should be noted that these good results in engine cleanliness are obtained with different contents of oil of group V according to the invention.

The invention claimed is:

1. A lubricant composition of a grade according to the SAEJ300 classification defined by the formula (I)

$$(X) W (Y) \tag{I}$$

wherein
X represents 0 or 5;
Y represents an integer ranging from 4 to 20; and comprising
(a) at least one polyalphaolefinic oil (PAO) for which the kinematic viscosity measured at 100 C according to the ASTM D445 standard ranges from 1.5 to 8 mm$^2$.s$^{-1}$;
(b) from 10 to 80% by weight of the composition of at least one oil of group V for which the kinematic viscosity measured at 100° C. according to the ASTM D445 standard ranges from 1.5 to 8 mm$^2$.s$^{-1}$;
(c) at least one comb polymer for which the three pendant chains comprise at least 50 carbon atoms and selected from among the copolymers of at least one polyolefin and of at least one poly(alkyl)methacrylate; the copolymers of at least one polyolefin and of at least one poly(alkyl)acrylate;
wherein the at least one oil of group V is selected from among
a monoester of formula (B1);

$$R^1 \underset{O}{\overset{O}{\parallel}} OR^2 \tag{B1}$$

wherein
$R^1$ represents a linear or branched, saturated or unsaturated hydrocarbon group, comprising from 14 to 24 carbon atoms;
$R^2$ represents a linear or branched, saturated or unsaturated hydrocarbon group, comprising from 2 to 18 carbon atoms; and
a polyalkylene-glycol (PAG) of formula (B2)

(B2)

wherein
R3 represents a linear or branched C1-C30-alkyl group;
m and n represent independently an average number ranging from 1 to 5; and
wherein the weight ratio (a/b) between the polyalphaolefinic oil (PAO) (a) and the oil of group V (b) ranges from 0.1 to 4.

2. The lubricant composition according to claim 1 of a grade according to the SAEJ300 classification selected from among 0W4, 0W8, 0W12, 0W16, 0W20, 5W4, 5W8, 5W12, 5W16, 5W20.

3. The lubricant composition according to claim 1, for which the kinematic viscosity measured at 40° C. according to the ASTM D445 standard ranges from 12 to 30 $mm^2.s^{-1}$.

4. The lubricant composition according to claim 1 for which the kinematic viscosity of the PAO, measured at 100° C. according to the ASTM D445 standard, ranges from 1.5 to 6 $mm^2.s^{-1}$.

5. The lubricant composition according to claim 1 for which the average molecular mass by weight of the PAO ranges from 50 to 500 Da.

6. The lubricant composition according to claim 1 comprising from 20 to 80% by weight of the oil composition of group V.

7. The lubricant composition according to claim 1, for which the comb polymer for which the pendant chains are obtained by polymerization or by copolymerization of olefins.

8. The lubricant composition according to claim 1, for which the comb polymer is prepared by copolymerization of an olefinic monomer of formula (C2)

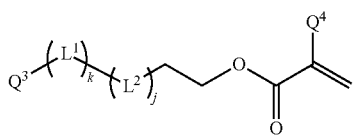
(C2)

wherein
$Q^3$ represents a linear or branched $C_2$-$C_8$-alkyl group; a $C_3$-$C_8$-cycloalkyl group; a $C_6$-$C_{10}$-aryl group;
$Q^4$ represents a hydrogen atom or a methyl group;
$L^1$ represents a residue of 1,4 addition of butadiene; a residue of 1,4 addition of butadiene substituted with at least one $C_1$-$C_6$-alkyl group; a residue of vinyl addition of styrene; a residue of vinyl addition of styrene substituted with at least one $C_1$-$C_6$-alkyl group;
$L^2$ represents a residue of vinyl addition of butadiene; a residue of vinyl addition of butadiene substituted with a $C_1$-$C_6$-alkyl group; a residue of vinyl addition of styrene; a residue of vinyl addition of styrene substituted with at least one $C_1$-$C_6$-alkyl group;
k and j represent independently 0 or an integer ranging from 1 to 3,000 and the sum (k+j) is equal to an integer ranging from 7 to 3,000; and
of an alkyl-acrylic ester monomer or alkyl-methacrylic ester of formula (C3)

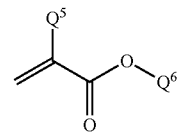
(C3)

wherein
$Q^5$ represents a hydrogen atom or a methyl group;
$Q^6$ represents a linear or branched $C_1$-$C_{26}$-alkyl group.

9. The lubricant composition according to claim 1 for which the comb polymer is prepared by copolymerization of an olefinic monomer of formula (C4)

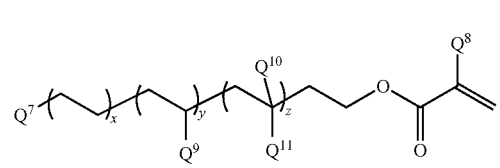
(C4)

wherein
$Q^7$ represents a $C_1$-$C_6$-alkyl group; a $C_6$-aryl group;
$Q^8$ represents a hydrogen atom or a methyl group;
$Q^9$, $Q^{10}$ and $Q^{11}$ represent independently a hydrogen atom or a $C_1$-$C_{18}$-alkyl group;
x, y and z represent independently 0 or an integer ranging from 1 to 3,000 and the sum (x+y+z) is equal to an integer ranging from 7 to 3,000; and
of a alkyl-acrylic ester monomer or methacrylic- alkyl ester of formula (C3)

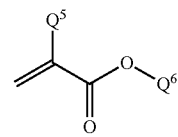
(C3)

wherein
$Q^5$ represents a hydrogen atom or a methyl group;
$Q^6$ represents a linear or branched $C_1$-$C_{26}$-alkyl group.

10. The lubricant composition according to claim 1, for which the VI is greater than 220.

11. A method for the lubrication of a vehicle engine or for improving the lubrication of a vehicle engine
during an urban cycle according to the European cycle NEDC; or
during an urban cycle according to the European cycle WLTP; or
during a cold cycle according to the European cycle ECE; comprising a step of applying the lubricant composition according to claim 1 to said vehicle engine.

12. The method according to claim 11 for lubricating an engine of a hybrid vehicle.

13. A method for improving the Fuel Eco (FE) of a lubricant or for reducing the fuel consumption of an engine, comprising a step of adding the lubricant composition according to claim 1 into said lubricant, or a step of applying the lubricant composition to said engine.

* * * * *